(12) United States Patent
Shinji et al.

(10) Patent No.: US 6,259,854 B1
(45) Date of Patent: Jul. 10, 2001

(54) LIGHTGUIDE

(75) Inventors: Osamu Shinji; Toshitaka Kunisawa, both of Niigata; Toshiyuki Yoshikawa, Tokyo; Kozo Yasuda, Ibaraki, all of (JP)

(73) Assignee: Kuraray Co., Ltd., Okayama (JP)

( * ) Notice: Subject to any disclaimer, the term of this patent is extended or adjusted under 35 U.S.C. 154(b) by 0 days.

(21) Appl. No.: 09/147,596
(22) PCT Filed: May 29, 1997
(86) PCT No.: PCT/JP97/01818
§ 371 Date: Jan. 29, 1999
§ 102(e) Date: Jan. 29, 1999
(87) PCT Pub. No.: WO98/54606
PCT Pub. Date: Dec. 3, 1998
(51) Int. Cl.[7] ..................................................... G02B 6/00
(52) U.S. Cl. .............................. 385/146; 385/901; 362/31
(58) Field of Search .............................. 362/31; 385/901, 385/146

(56) References Cited

U.S. PATENT DOCUMENTS

| 5,776,636 | | 7/1998 | Kunisawa et al. . | |
|---|---|---|---|---|
| 6,075,649 | * | 6/2000 | Naito | 385/146 |
| 6,088,074 | * | 7/2000 | Suzuki | 385/901 |

FOREIGN PATENT DOCUMENTS

| 07225323 | * | 8/1995 | (JP) . |
|---|---|---|---|
| 07261029 | * | 10/1995 | (JP) . |

* cited by examiner

Primary Examiner—Hung N. Ngo
(74) Attorney, Agent, or Firm—Oblon, Spivak, McClelland, Maier & Neustadt, P.C.

(57) ABSTRACT

A lightguide which guides light from at least one side end plane and includes a plurality of approximately trapezoidal protrusions whose apex edge in the cross section perpendicular to the axis of a linear light source has a partially straight section. The approximately trapezoidal protrusions are arranged on the rear surface of the lightguide, opposing a light emitting surface. The approximately trapezoidal protrusions are arranged in a pattern of specks, solid lines, or broken lines. The pattern has a low area density in a region neighboring the at least one side end plane and at a high area density in a region removed from the at least one side end plane such that the luminance distribution of the light emitted from the light emitting surface is approximately uniform. Preferably, the approximately trapezoidal protrusions have, in the same cross section, two rounded corners, and the roughness of the surface that includes the apex edge of the protrusions, the roughness of the rear surface excluding the protrusions, is less than 0.2 $\mu$m, the ratio of the height H to the width W of the approximately trapezoidal protrusions in the same cross-section be $0.1 \leq H/W \leq 0.6$, and the width W is $20 \, \mu m \leq W \leq 200 \, \mu m$.

5 Claims, 9 Drawing Sheets

FIG. 6
TRAPEZOIDAL δ=2°

FIG. 7
TRAPEZOIDAL δ=5°

LIGHTGUIDE

TECHNICAL FIELD

The present invention relates to a lightguide for a surface light source for use in a liquid crystal display and the like. The present inventive lightguide may be used effectively as a back illuminator of a liquid crystal display of a word-processor, a personal computer, a thin television set and the like.

BACKGROUND OF THE INVENTION

A surface light source device fitted with a so-called edge-light type lightguide arranged so as to illuminate by inputting light from a side end plane of a transparent plate and by emitting the light from the other plane thereof (light emitting surface) is used as a back illuminator of a liquid crystal display of a word-processor, a personal computer, a thin television set and the like. Such surface light source device is constructed such that a tubular light source is disposed at one side end plane, two side end planes perpendicular to each other or two side end planes opposing to each other of the lightguide in general and the remaining planes of the lightguide, except of the incident side end plane and the light emitting surface, and the back side of the tubular light source are covered by a light reflector.

In order to emit primary light inputted from the side end plane of the lightguide uniformly and efficiently from the whole light emitting surface of the lightguide, it is necessary to arrange the lightguide such that its scattering-reflecting capability is low around a light source and its light diffusing-reflecting capability is high at the region farthest from the light source and to distribute the light such that the most of the inputted primary light is emitted from the emitting surface in scattering and reflecting the light guided to the lightguide in the direction perpendicular to its traveling direction. Then, a variety of principles and processing methods for giving such scattering and reflecting capability have been proposed as described below and part of them have been put into practical use.

(1) Those Characterized Mainly by Rough Surface:

There are ones in which the whole light emitting surface or the surface facing thereto is roughened (See JP-A-3-118593, JP-A-118248, etc.), in which the roughness of the rough surface is changed (See JP-A-63-168604, etc.) or in which speckled or linear rough surface patterns are disposed and formed by changing its a real density (See JP-A-4-162002). The surface is roughened by sand-blasting or chemically etching a die and the surface rough patterns are formed by combining photo-etching and sand-blasting (See JP-A-4-52286).

(2) Those in Which Scattering Reflector is Applied:

Those in which a scattering-reflecting substance containing white paint or particles is applied in a meshed dot or linear pattern on the rear surface facing to the light emitting surface by means of screen printing or the like (See JP-A-57-12838, JP-A-1-245220, etc.). Its manufacturing process includes two steps of forming a specular plate having no pattern and of printing the patterns.

(3) Those Characterized Mainly by Diffusion of Bulk:

There have been disclosed ones in which lightguide bulk resin itself is adopted as a light diffusing-scattering substance by mixing light scattering particles, by blending non-compatible polymer or by co-polymerization (See JP-A-1-172801, JP-A-2-221924, JP-A-5-249319, JP-A-6-186560, etc.).

(4) Those Caused by Protruding or Concave Patterns:

These are divided roughly into the following three types. These are fabricated by machining a lightguide itself or a molding die by machine cutting, laser processing, die etching or the like.

1) Concave Patterns:

There are ones in which concave patterns are disposed on a light emitting surface or on a surface facing thereto on the datum plane. There are, for example, ones having one-dimensional linear triangle grooves (See JP-A-2-165504, JP-A-6-3526), rectangular grooves (See JP-A-6-123810, JP-A-6-265731, etc.), semi-circular grooves (See JP-A-5-79537U), broken-line shaped triangular grooves (See JP-A-5-196936, JP-A-5-216030, etc.) and others. There are also those having two-dimensional conical or pyramid engraving (See JP-A-4-278922), semispherical engraving (See JP-A-6-289393, etc.) and cylindrical engraving (See JP-A-1-145902U). There have been also proposed one in which the inner surface of a concave portion of the pattern is roughened (See JP-A-4-355408, JP-A-5-94802U, etc.).

2) Protruding Patterns:

There are ones in which protruding patterns are disposed on a light emitting surface or on a surface facing thereto on the datum plane. There are, for example, ones having one-dimensional linear triangle protrusions (See JP-A-5-313163, JP-A-6-75123), rectangular protrusions (See JP-A-5-79537U) and semi-circular protrusions (See JP-A-6-281928). There is also one having two-dimensional semispherical protrusions (See JP-A-5-79537U, JP-A-6-281929, etc.). There are also ones in which those protruding parts are roughened (See JP-A-5-94802U, JP-A-6-186562, etc.).

3) Concave and Protruding Patterns:

There are ones which have no flat plane on a light emitting surface or on a surface facing thereto and in which one-dimensional saw-tooth patterns or two-dimensional grid patterns are disposed. There are, for example, ones having the one-dimensional saw-tooth patterns (See JP-A-64-11203, JP-A-6-250024, etc.) and the two-dimensional grid patterns (See JP-A-62-278505, JP-A-3-189679, etc.) and ones whose surface is roughened as a whole (See JP-A-6-342159, JP-A-6-123885, etc.).

In addition to the demands on high luminance and high uniformity ratio of illuminance of the past, the demand on a large screen, thin-type, light-weight and low power consumption display is growing more and more lately. The trend is now shifting from a plate-like lightguide which has been put into practical use mainly by the printed patterns of (2) of the past to a tapered (wedge) type lightguide which is thinner and lighter. Then, the pattern printing step which has been required in the technology of (2) described above has become unnecessary and injection molding which allows scattering reflection patterns to be formed in the same time is considered to be desirable in terms of the cost.

From this aspect, the above-mentioned methods (1) through (4) have had the following various problems, respectively.

Although those having the uniform rough surface by the method (1) can be mass-produced by injection molding by using a die, it has had problems that the die is complicated because the die must be formed into a complicated curved wedge shape such that region where primary light enters is fully thickened and the region distant from the light source is thinned in order to attain uniform luminance as a surface light source, the degree of freedom of the shape of the lightguide is restricted and there is a limitation in increasing the area and thinning of the lightguide in principle. Further, although there has been a proposal of changing the surface roughness, it is very difficult to realize that. Meanwhile, although the method of distributing the rough surface as speckle or linear patterns is a relatively excellent method which allows the shape of the lightguide to be freely formed and the luminance to be uniformed in the pattern design, it is risky because of unstable elements in the die fabrication process such as variation between accuracy of photo-etching in forming the patterns and the surface roughening process such as blast in the next step in creating the die.

Although the printing method (2) has been the method put into the practical use most for the conventional plate type lightguides, it has had a problem, as a first problem, that it does not have a merit in terms of the cost as compared to the method of forming patterns in the same time by injection molding because the pattern printing step is a separate step. Further, it has had a problem that the pitch of dots of the scattering reflection patterns cannot be made smaller than around 1 mm (see JP-A-5-100118) due to the limit of the printing accuracy (see JP-A-4-289822). Further, due to this problem of the printing accuracy, the reproducibility of minimum points and minimum lines is low during the pattern printing, thus lowering the production yield and increasing the cost (see JP-A-3-9304, JP-A-4-278922). Still more, in terms of its performance, a difference of brightness occurs locally between regions where the pattern exists and where the pattern does not exist because the pattern is rough, thus causing luminous unevenness, so that it is a general practice to uniform the local unevenness of luminance caused by the rough pattern by providing a diffusing plate or a diffusing sheet having a high diffusing efficiency on the emitting surface side of the lightguide. However, because the diffusing plate or the diffusing sheet having a high diffusing efficiency has a low total ray transmission factor, it causes loss, thus lowering the luminance (see JP-A-5-100118, JP-A-6-265732).

In case when rough patterns are disposed orderly, moire occurs between a prism sheet or a liquid crystal panel disposed in order to increase luminance in the vertical direction on the emitting surface side of the lightguide due to the local luminous unevenness. Although methods of setting pattern intervals at random (see JP-A-5-313017 and JP-A-6-242442) or of disposing the patterns obliquely with respect to a ridge-line direction of the prism sheet (see JP-A-5-257144 and JP-A-6-230228) have been proposed in order to prevent that, they make it difficult to design or to assemble.

Although the method (3) allows mass-production by injection molding or the like and is anticipated to cause no local luminous unevenness at all due to the pattern in principle, it is considered to be difficult to achieve the uniform luminance just by the bulk scattering method. Further, it is not easy to give the distribution of the light diffusing performance to the lightguide bulk itself and is difficult to mass-produce. Further, it is necessary to change the thickness of the tapered shape or the like or to create concave and protruding patterns to realize the uniform luminance by a resin material of uniform diffusing agent. Thus, there is a possibility that it becomes complicated as it is required to use other means for achieving the uniform luminance or that the restriction on the shape of the lightguide becomes a big problem.

The method (4) is an excellent method in terms of mass-producibility when press or injection molding is used by using a die. As means for achieving the concave and protruding patterns, methods of using mechanical cutting, laser processing or chemical etching have been disclosed. However, as for the pattern shaping accuracy, the dimensional accuracy and the roughness of the plane where the patterns are created, all of the processing methods have had considerable difficulties and have been risky in terms of the processing stability, reproducibility and cost when the lightguide has minute patterns and has a large area. Lightguides which have been put into practical use so far have been small lightguides of several inch in size having pattern pitch of around 1 mm and the problem of the pattern roughness in (2) still exists. Further, ones in which a relatively large irregular plane is created and the irregular plane is roughened further has had problems that variation caused in the roughening process adds on the problem of the accuracy in creating the irregular plane, thus causing unstableness in fabricating a die and causing a problem in terms of the cost in fabricating the die.

Accordingly, it is an object of the present invention to provide a uniform, thin and large-area lightguide causing no local luminous unevenness or no luminous unevenness on the whole light emitting surface by emitting primary light incident on the lightguide efficiently from a light emitting surface.

DISCLOSURE OF THE INVENTION

In order to achieve the above-mentioned object, a lightguide of the present invention has the following characteristics.

That is, a lightguide which guide light at least from one side end plane is characterized in that a large number of approximately trapezoidal protruding patterns whose apex edge at the cross section perpendicular to the axis of a linear light source has a straight section partly are arranged on the rear surface on the opposite side from a light emitting surface in a pattern of specks, solid lines or broken line shapes at a low density in a region close to the linear light source and at a high density in a region far from the linear light source so as to make the luminance distribution of the light emitted from the light emitting surface approximately uniform. Here, it is preferable to be that the protruding pattern has the approximately trapezoidal shape whose two corners corresponding to the both ends of the apex edge at the cross section perpendicular to the axis of the linear light source are round, that the roughness of the surface composing the apex edge of the protruding pattern and the roughness of the surface where no protruding pattern is provided on the protruding pattern forming plane are less than 0.2 μm, that the ratio H/W is $0.1 \leq H/W \leq 0.6$, where W and H denote cross-sectional width and height of the protruding pattern, and that the cross-sectional width W (μm) of the protruding pattern is $20 \leq W \leq 200$, respectively.

The present invention will be explained below in detail.

Figure 1A:
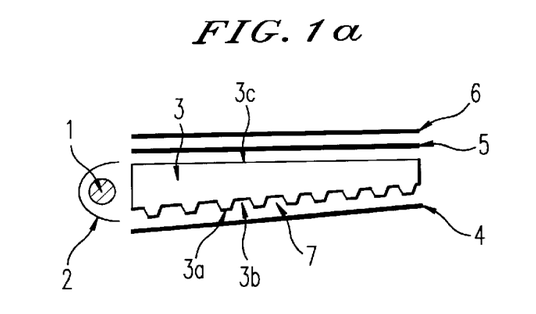
FIG. 1 shows one structural example of an illuminator using an edge-light type lightguide illuminator of the present invention.
Figure 1B:
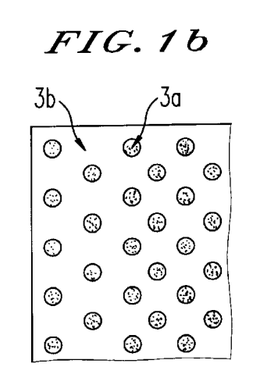
Figure 1C:
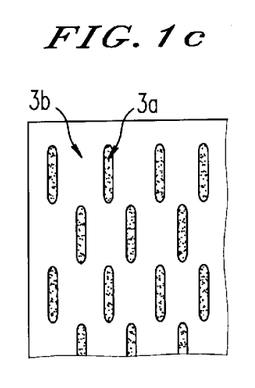
Figure 1D:
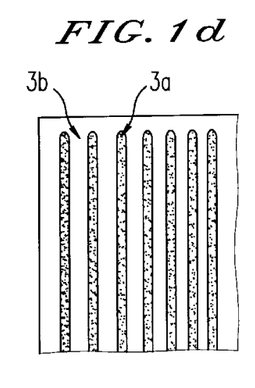
Figure 1E:
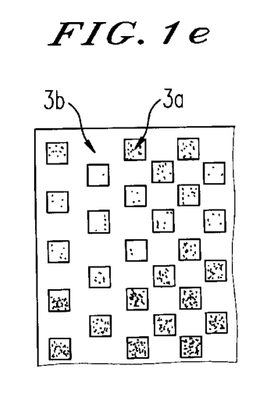
Figure 1F:
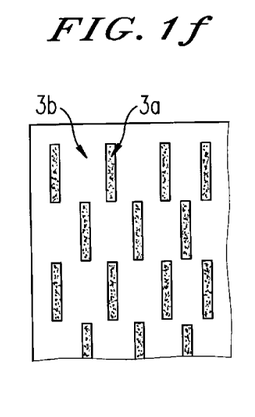
Figure 1G:
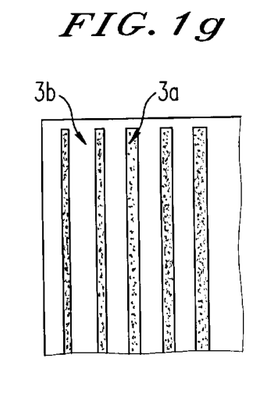

FIG. 1 shows one embodiment of the present invention, wherein FIG. 1(a) is a section view of a cross section thereof perpendicular to the axis of the linear primary light source. In the figure, scattering reflection surfaces 3a and 3b are formed on the rear surface on the opposite side from a light emitting surface 3c of the lightguide 3 and protruding patterns 3a having approximately a trapezoidal shape whose apex edge is straight partially are provided at a low density at the region close to the primary light source 1 and at a high density at the region far therefrom. The light source is not limited to be an one-lamp type and may be a two-lamp type in which lights are disposed so as to face each other. Or, an L-shaped light source may be used and light may be guided from two end planes perpendicular to each other. A reflecting plate or a reflecting sheet 4 is disposed at the scattering reflection planes 3a and 3b via an air layer 7. FIG. 1(b) is a plan view of the light emitting surface of the lightguide 3 and illustrates those having the speckled, chain line-shaped and linear patterns 3a. The speck is not limited to be circular and may be polygonal. The chain line may be one in which solid lines having round ends are connected or one in which rectangular solid lines are connected. The shape of the large number of patterns seen plan-wise is not confined to be the same. The specks, chain lines and straight line patterns may be combined or the size and the width of the plurality of patterns may be changed. As the material of the lightguide are used transparent materials such as polystyrene, polycarbonates, and ABS resins in addition to acrylic resins. Also are used light-scattering semi-transparent materials having inorganic light scattering materials or hetero-polymers having a different refractive index dispersed therein.

Figure 2:
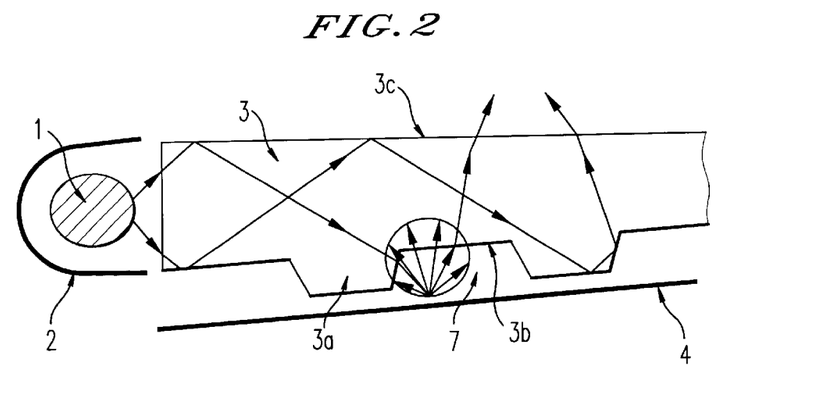
FIG. 2 is a partially enlarged explanatory diagram of the edge-light type lightguide of the present invention.

FIG. 2 is a partially enlarged view of the cross section of the inventive lightguide shown in FIG. 1, wherein the light rays from the primary light source propagate within the lightguide while being totally reflected by the emitting surface 3c and the level surface 3b of the opposing scattering reflection surface of the lightguide. The light rays incident on the protruding pattern 3a on the scattering reflection surface are reflected and refracted by the pattern and part thereof is emitted directly from the pattern and the other part thereof is emitted from the emitting surface 3c after being reflected by the reflection plate 4.

(1) About Shape of Patterns:

FIG. 3 classifies behaviors of the reflection and refraction of the ray incident on the protruding pattern in unit pattern. A light ray L0 inputted to the pattern 3a whose cross section is trapezoidal as shown in FIG. 3(a) is totally reflected by the apex edge BC, and by the sloped edge CD in some cases, is returned to the lightguide via the edge AD as it is and becomes propagating light by totally being reflected again by the emitting surface 3c within the total reflection critical angle. This light ray is not emitted. The pattern by which the ratio of the light ray L1 which does not contribute to the emission among the total light rays L0 incident on the pattern as described above can be said as a pattern whose scattering and emitting efficiency is low. However, because this light ray becomes the propagating light again, it causes no loss as described later.

Figure 3A:
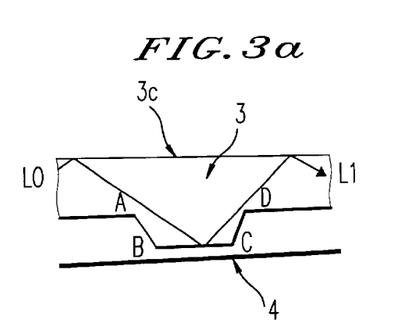
FIG. 3 is diagram classifying scattering reflection rays of protruding patterns whose cross section is trapezoidal.
Figure 3B:
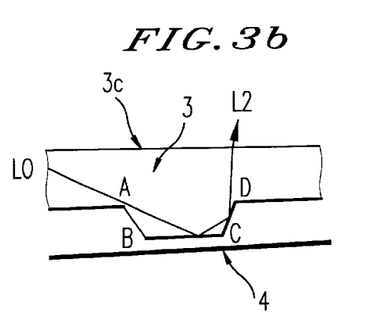

In FIG. 3(b), although the pattern incident light L0 is totally reflected by the apex edge BC and the sloped edge CD and returns to the lightguide 3 via the edge AD, it becomes a light ray L2 which is emitted from the emitting surface 3c by exceeding the critical angle. The light rays which are emitted after undergoing only the total reflection cause least loss and its ray utility factor is high.

Figure 3C:
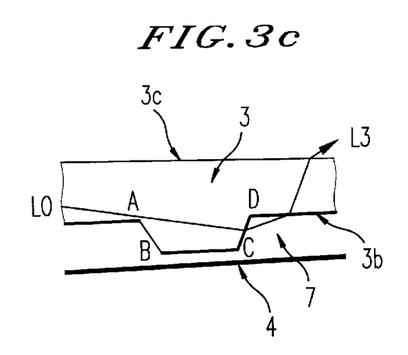

In FIG. 3(c), while the incident light L0 is emitted to the air layer 7 once after being totally reflected at the apex edge BC or directly by being refracted and transmitting from the sloped edge CD, it enters the level surface 3b of the reflecting and scattering surface again because it heads upward. Because the level surface 3b and the emitting surface 3c are almost parallel each other, this light ray L3 is emitted from the emitting surface 3c. Although this ray L3 is a ray which causes less loss similarly to the ray L2, it causes reflection loss at two interfaces because it transmits through the edge CD and the scattering and emitting level surface 3b which are interfaces having different refractive indices in extra, thus dropping the ray utility factor. For instance, when it is an interface of the lightguide made of acrylic resin (refractive index: 1.49) and air (refractive index: 1.00), reflection loss occurs at least by about 4% at one interface and by about 8% at two interfaces. The reflection loss is greater because the incident on the interface 3b is not vertical. Not all of the reflected light of 8% or more is not lost. A part of them is utilized again as it becomes a ray which heads toward the opposite direction within the lightguide and the other part is utilized as light emitted from the emitting surface because it is reflected by the reflecting plate or the reflecting sheet 4 on the back. However, the most of such rays are lost and cannot be used as they become stray light which has lost its directionality.

Figure 3D:
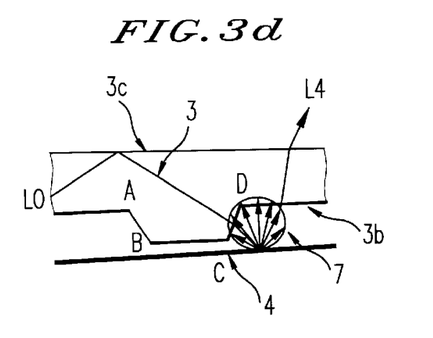

In FIG. 3(d), while the incident light L0 is refracted and transmits directly through the sloped edge CD and is emitted to the air layer 7, its refraction angle is downward and the ray enters the reflection sheet 4. The reflection sheet is a diffusion reflection sheet or a metal-evaporated specular reflection sheet and the most of the rays reflected by that are emitted as the rays L4 from the emitting surface of the lightguide as long as they hit against the scattering reflection specular plane 3b. However, when the reflection sheet is the diffusion reflection sheet, loss occurs because the rays reflect not only in the direction vertical to the reflection sheet but also in the direction close to the horizontal direction and do not enter again to the lightguide or because of the reflection loss of the diffusion reflection sheet itself. Further, when the reflection sheet is the metal specular reflector, absorption loss of the reflector occurs because the reflectance thereof is 70 to 90% in general. Accordingly, such ray L4 causes the largest loss in terms of the ray utility factor.

The scattering reflection performance and the ray utility factor of unit pattern may be evaluated by studying the ratio of the incident light ray L0 inputted to the protruding pattern whose cross section is approximately trapezoidal and scattered and reflected into L1, L2, L3 and L4 per one unit pattern. A pattern which increases the ratio of the scattering rays L2+L+L4 with respect to the total ray L0 incident on the pattern is a pattern having a higher scattering reflection efficiency. Specifically, the larger the ratio of the scattering rays L2, L3 and L4 in this order, the smaller the loss is and the higher the ray utility factor of the pattern is.

Figure 4:
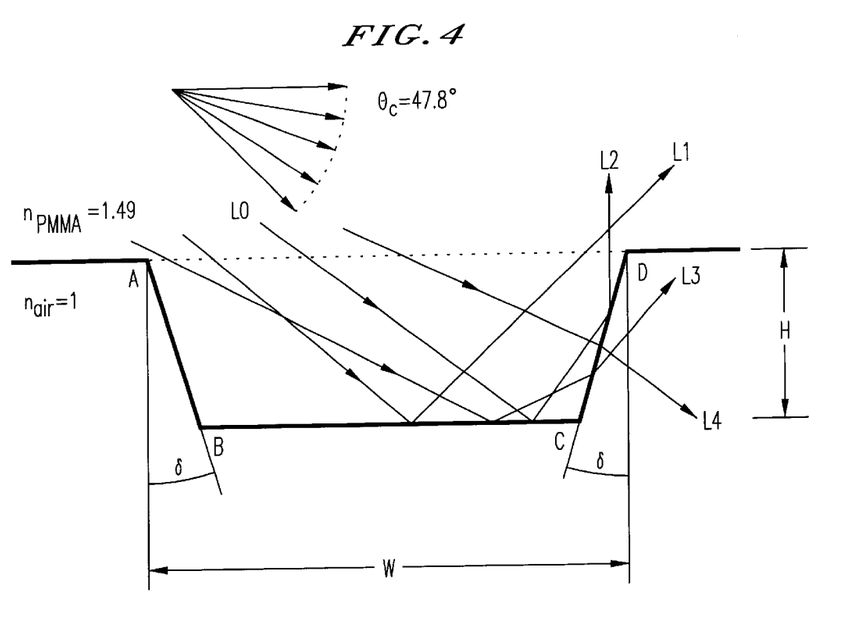
FIG. 4 is an explanatory diagram of ray tracking simulation of a protruding pattern whose cross section is trapezoidal.
Figure 5:
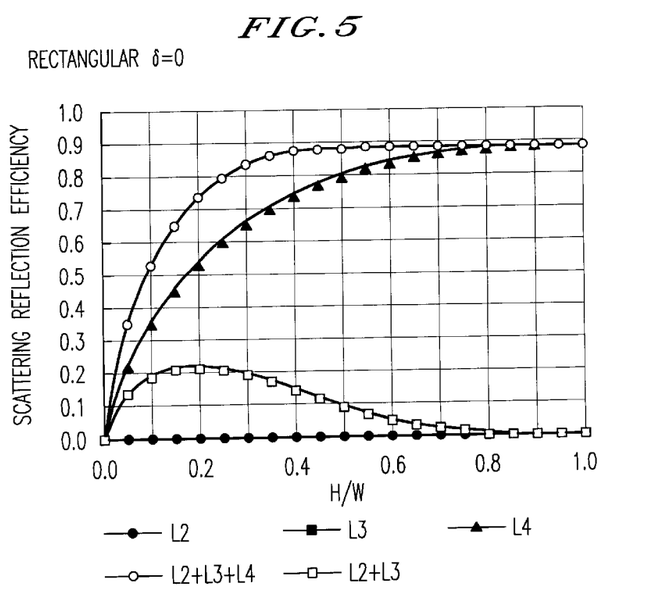
FIG. 5 is a graph showing a calculation result of the ray tracking simulation of the protruding pattern whose cross section is rectangular.
Figure 6:
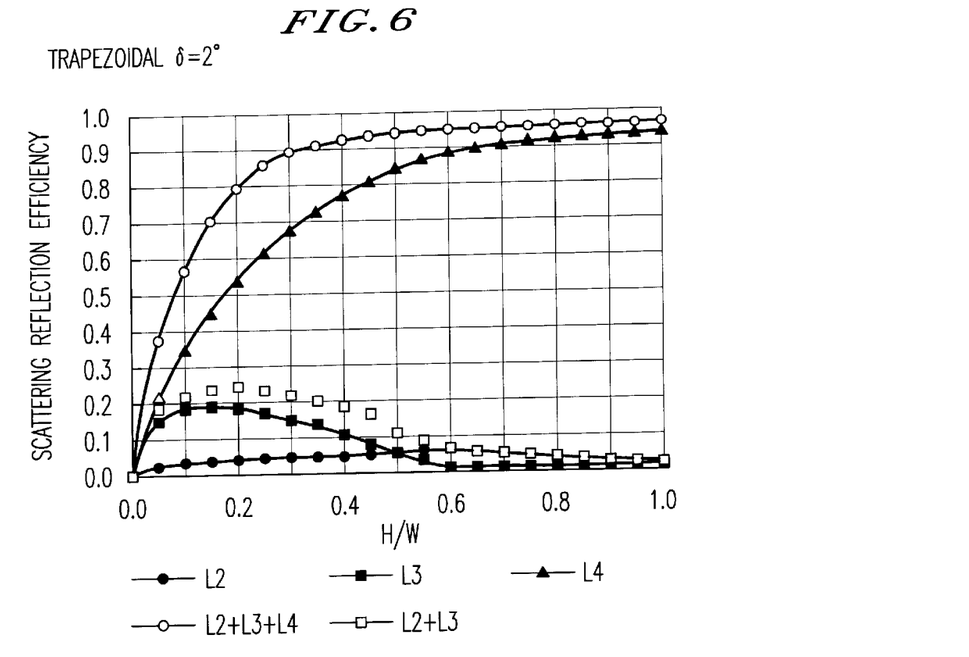
FIG. 6 is a graph showing a calculation result of the ray tracking simulation of the protruding pattern whose cross section is rectangular.
Figure 7:
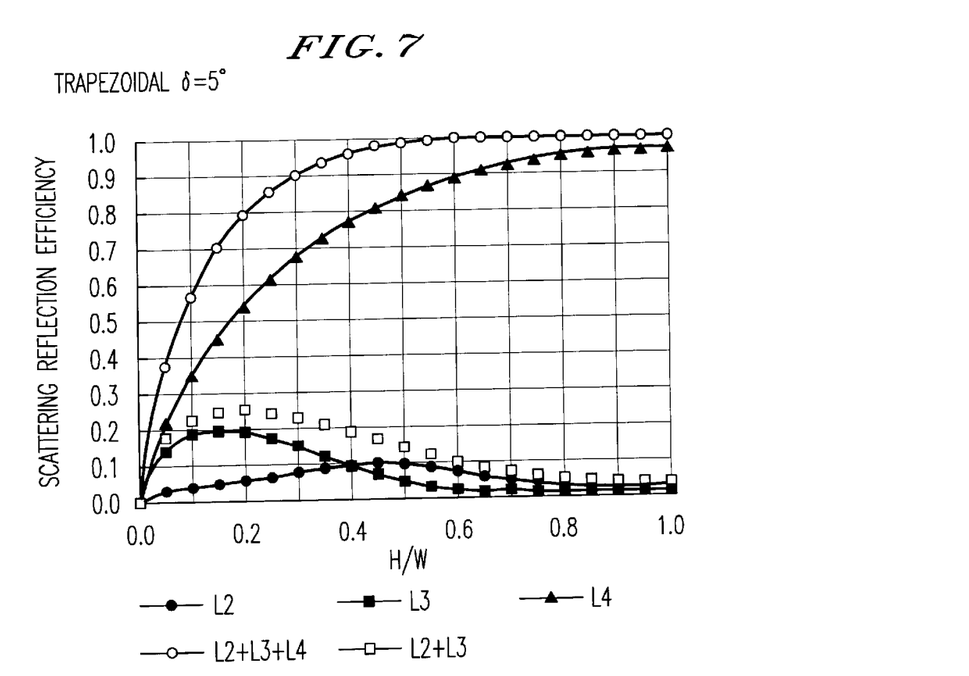
FIG. 7 is a graph showing a calculation result of the ray tracking simulation of the protruding pattern whose cross section is trapezoidal.
Figure 8:
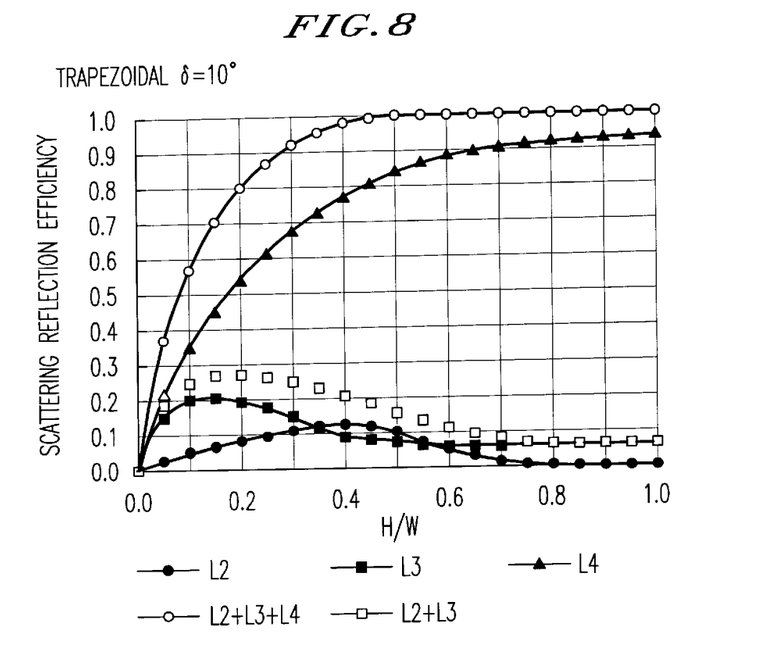
FIG. 8 is a graph showing a calculation result of the ray tracking simulation of the protruding pattern whose cross section is trapezoidal.
Figure 9:
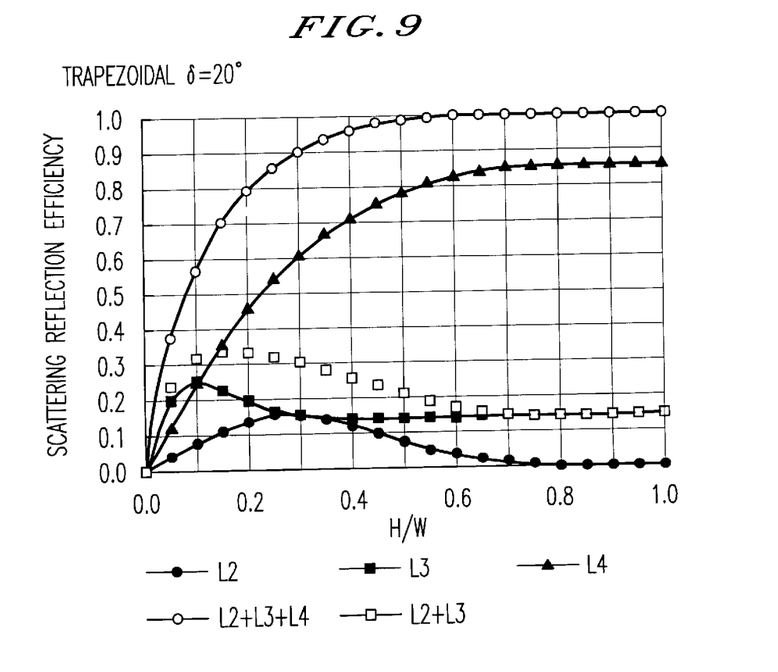
FIG. 9 is a graph showing a calculation result of the ray tracking simulation of the protruding pattern whose cross section is trapezoidal.
Figure 10:
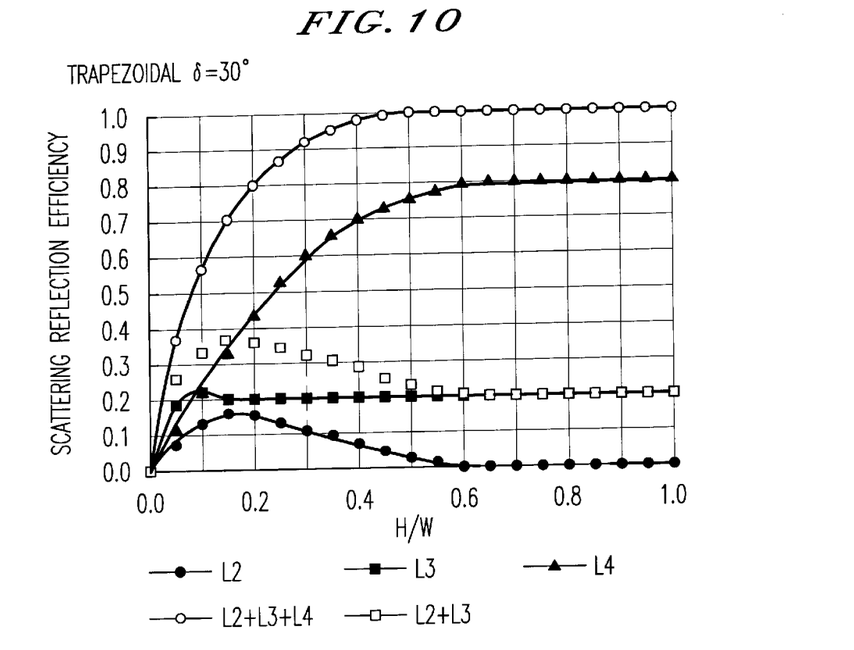
FIG. 10 is a graph showing a calculation result of the ray tracking simulation of the protruding pattern whose cross section is trapezoidal.
Figure 11:
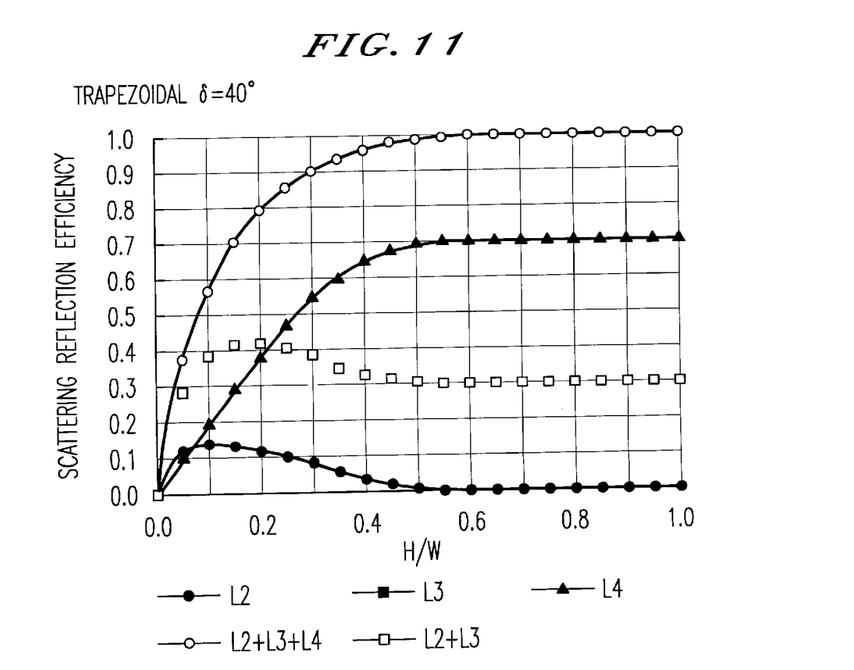
FIG. 11 is a graph showing a calculation result of the ray tracking simulation of the protruding pattern whose cross section is trapezoidal.

The inventors calculated the ratio of the scattering lights becoming L1 through L4 on the trapezoidal protruding pattern ABCD of the acrylic lightguide as shown in FIG. 4 (refractive index of acryl: 1.49, refractive index of air: 1.00) by changing the trapezoidal pattern width W, the pattern height H and the pattern slope angle δ by assuming that the rays enter from the incident edge AD with an incident angle $\theta=0°$ to a critical angle $\theta=\theta c$ (=47.8°). The incident rays L0 were inputted by generating 10,000 uniform strength rays in total and by inputting from respective section points obtained by dividing the incident edge AD into 100 equal parts as incident positions and with each equally divided angle obtained by dividing $\theta=0$ to $\theta c$ equally into 100 parts. The ratio with respect to the whole rays L0 was calculated by calculating normal reflection and refraction at the edges AB, BC and CD and by totaling as the scattering rays L1 through L4.

The results of the ratio of L2, L3, L4 and others to the whole incident rays L0 with respect to H/W calculated by changing the pattern slope angle δ is shown in FIGS. 5 through 11. The sum of the respective ratios of L1+L2+L3 is a pattern scattering reflection efficiency (hereinafter denoted as η). In case when the slope angle of the trapezoid $\delta \geq 5°$ (In FIGS. 7 through 11), $\eta=0.57$ when H/W=0.1 and $\eta=1.0$ when H/W=0.60. When H/W<0.1, i.e., when the pattern width is equal to or greater than ten times of the pattern height, $\eta<0.57$, so that the scattering reflection efficiency becomes low as unit pattern. In contrary, when H/W>0.6, the scattering reflection efficiency η saturates, indicating that it is not effective to extremely increase the pattern height with respect to the pattern width because it enhances the difficulty in engraving a die or in molding the pattern.

When the pattern is rectangular (FIG. 5, δ=0°) or when the trapezoid slope angle is small (FIG. 6, δ=2°), the scattering reflection efficiency η<1 and is bad even when H/W≧0.6. It is because there exists ray which is totally reflected by the rectangular edges AB, BC and CD when the pattern incident angle θ is large and which becomes propagating light again with the same angle with the incident angle to the pattern. Accordingly, a trapezoidal pattern whose slope angle δ>5° is preferable in terms of the scattering reflection efficiency η.

As for the ray utility factor, a pattern by which the ratio of L2 and L3 with respect to the incident ray L0 increases is preferable. In this aspect, in the range of 0.1≦H/W≦0.6, a pattern having δ=10 to 30° is a pattern having a high ray utility factor and which causes less loss for L2 and the greater the δ, the higher the ray utility factor and the less the loss of the pattern is for L2+L3. In case of the rectangular pattern (δ=0°), L2=0 and L3 is also smaller than that of the trapezoid. Accordingly, it is apparent that the trapezoidal pattern is excellent also from the aspect of the ray utility factor.

The reason why the ratio of L2 is small when δ<10° (FIGS. 5 through 7) is because the ray which is totally reflected twice by the trapezoid apex edge BC and the slope edge CD becomes propagating light again without causing angular change because the angle of the trapezoid slope edge CD is close to that of the rectangle. Further, L2 reduces because the ratio of the length of the apex edge BC with respect to the trapezoid pattern width W decreases when δ>30° (FIG. 11) and less rays hit against the apex edge BC among the pattern incident rays. Accordingly, a pattern having the trapezoid slope angle δ=10 to 30° is desirable to have large ray utility factor and to reduce loss.

As described above, the trapezoidal pattern is better in any aspects of the scattering reflection efficiency η and the ray utility factor.

(2) Cross-Sectional Shape and Moldability:

The finer the patterns, the greater the difficulty is in terms of production in fabricating the die, in transferring the pattern and in releasing the die and molded products in actually fabricating the lightguides. Accordingly, the trapezoidal pattern is preferable more than the rectangular pattern and the trapezoid whose corners at the both ends of the apex edge are rounded is more preferable. For instance, it is very difficult to cut a slope of a rectangular pattern (δ=0°) having a width of 10 μm vertically or to cut the angle of the both ends of the apex edges accurately. Even if it is possible to create the die, the releasability of the molded product and the die is very bad. The larger the surface angle δ, the easier to fabricate the die and the better the moldability is. Further, the pattern having the trapezoidal shape whose corners are rounded has better mold-transferability and releasability and can be readily produced. FIG. 12 is an explanatory diagram of the patterns whose cross section is trapezoidal (a) and those having round corners (b through d) in the inventive lightguides. What is important as the unit scattering pattern is that its cross section is the approximately trapezoid having the apex edge BC and the slope edges AB and CD as described above. The protruding trapezoidal pattern which has the straight apex edge BC (W0>0), whose slope angle δ is large and which has the round corners is a preferable pattern in terms of the transferability and releasability in molding it.

Figure 12A:
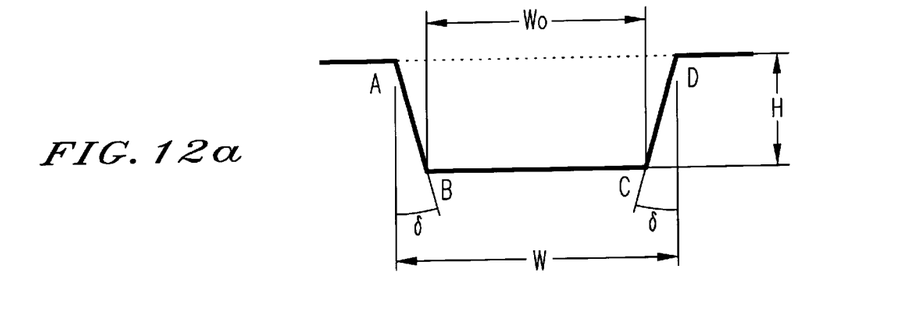
FIG. 12 is a diagram showing the shape of trapezoidal protruding patterns whose corners are rounded.
Figure 12B:
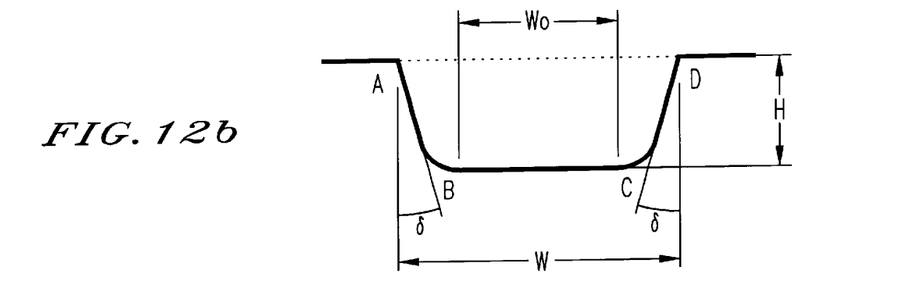
Figure 12C:
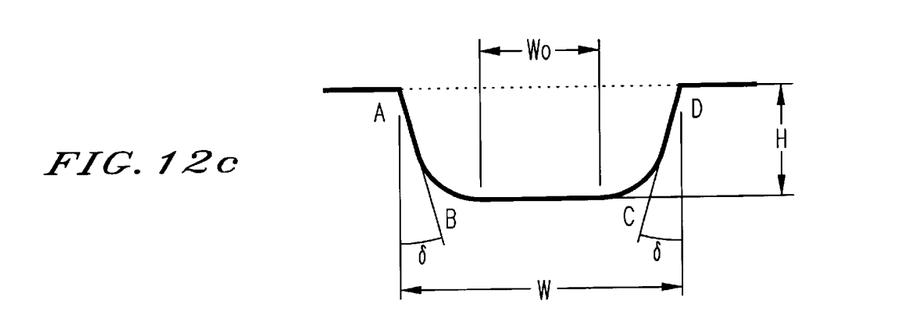
Figure 12D:
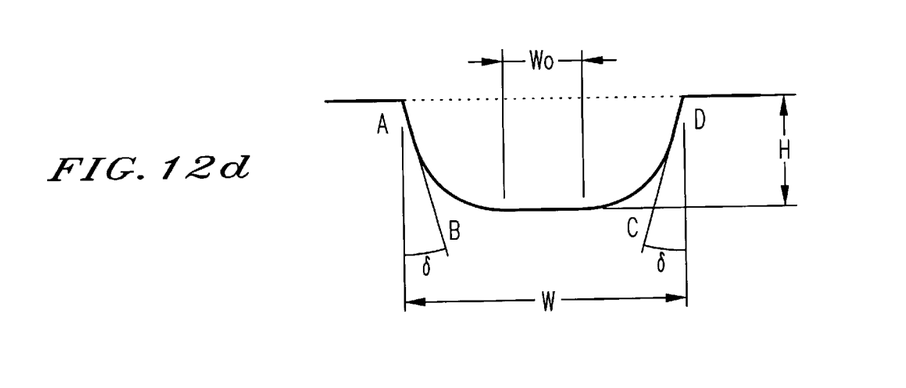
Figure 13A:
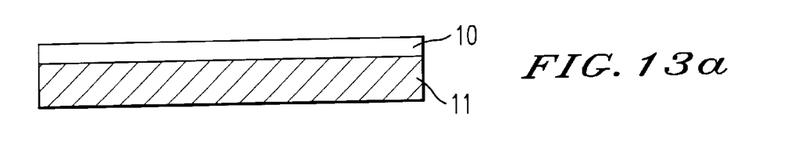
FIG. 13 is an explanatory diagram showing a method for fabricating a die of the protruding patterns by using photolithography.
Figure 13B:
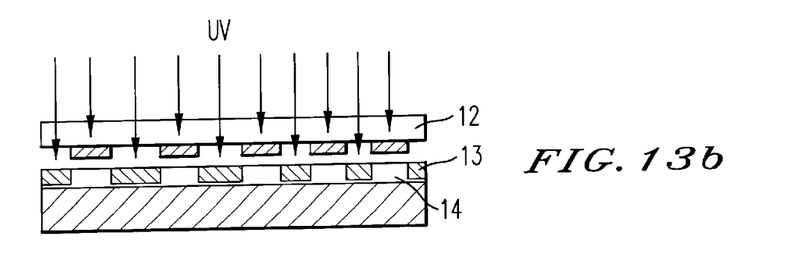
Figure 13C:
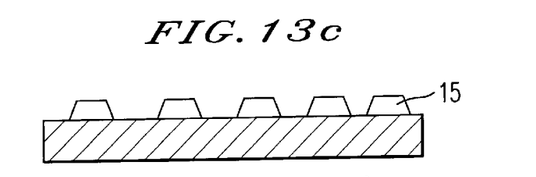
Figure 13D:
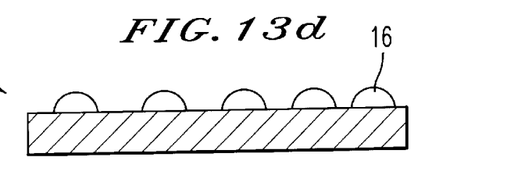
Figure 13E:
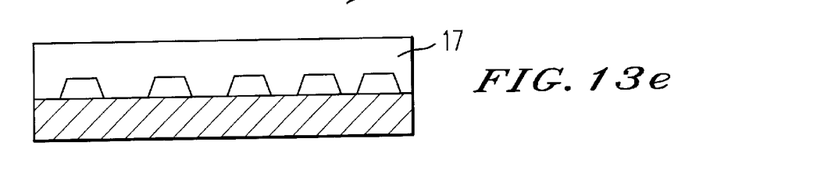
Figure 13F:
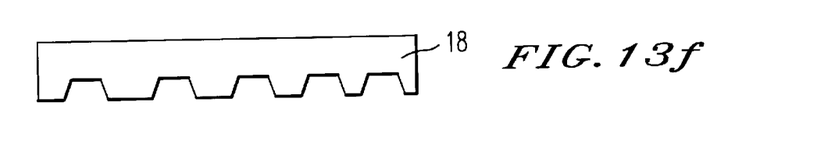

(3) Fine Patterns:

The present inventive trapezoidal fine protruding patterns may be molded by a die fabricated using photo-lithography as shown in FIG. 13. At first, (a) resist is applied by means of spin-coating or the like on a substrate such as glass so as to have a predetermined thickness. Next, (b) patterns are exposed on the resist film by directly lithographing predetermined patterns by an electron beam or laser lithography system or by overlaying a photomask on which predetermined patterns are lithographed on the resist film and by exposing ultraviolet rays. Then, (c) the resist patterns are formed on the substrate such that they are formed into a trapezoidal shape as shown in FIG. 12(a) by developing the resist film on which the patterns are exposed. The height of the pattern at this time is determined by the thickness of the spin-coating. (d) When a heat treatment is implemented here for example, the resist whose cross section is trapezoidal is put into a semi-molten state and is deformed into the trapezoidal shape whose corners are rounded (see FIGS. 12(b) through (d). The degree of the roundness may be controlled by time and temperature. Next, (e) after implementing a conductive process on the surface, a molding die (f) in which the patterns are provided is obtained by nickel electroforming or the like. The lightguide on which the fine protruding scattering reflection patterns are formed may be fabricated by means of injection molding or press molding by using this die and the transparent material such as acryl.

As for the pattern lithography, because the electron beam lithographic method has a lithographic accuracy of about 0.1 μm and the laser beam lithographic method also has an accuracy of 1 to 2 μm, the die on which any fine and planar patterns of about several tens Am are created may be formed readily and at high precision. Although the width W of the pattern may be arbitrarily set at several pm or more, it is preferable to be fully large so as not to produce interference color due to the fine structure (see JP-A-6-160636) and to be fully small so as to keep the luminous unevenness inconspicuous. It is then preferable to be 10 to 300 μm or to be 20 to 200 μm. The height of the resist pattern, i.e., the height H of the trapezoidal pattern, may be readily controlled by the thickness of the spin-coating and may be set at several to 30 μm for example. The trapezoid slope angle δ may be controlled to be δ=5 to 40° by changing the exposure or developing conditions by interposing a spacer between the photomask and the resist substrate for example.

Although it is not intended to limit the manufacturing method in practicing the present invention, such photolithographic technology allows a large number of fine patterns whose cross section is trapezoidal having an arbitrary planar shape, which could not be formed readily by the conventional pattern machining methods such as mechanical cutting, laser processing and chemical etching, to be formed in a large screen at high precision, with good reproducibility, readily and at low cost.

(4) Surface Accuracy:

It is important for the level surface 3b of the lightguide to be specular to totally reflect the light and to guide the light far from the light source without causing loss by scattering. It is preferable, also in this aspect, to keep the roughness of the emitting surface of the level surface 3b of the molded product to be less than 0.2 μm by using the glass substrate having a high specular accuracy as the resist substrate. Further, while the smoothness and reproducibility of at least the plane of the apex edge BC of the trapezoidal pattern are important in terms of the scattering reflection efficiency, the ray utility factor or the reproducibility of the patterns, it is possible to readily achieve the resist film whose surface roughness is less 0.2 μm with good reproducibility. Further, the smoothness of less than 0.2 μm of surface roughness of not only the plane of the apex edge BC but also the planes of the slope edges AB and CD may be readily realized by treating the resist pattern by heat.

Figure 14A:
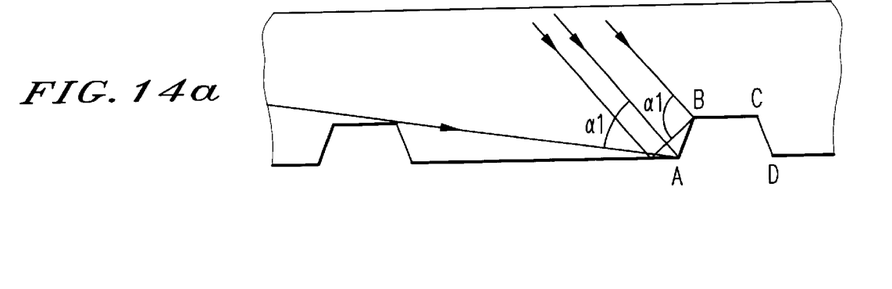
FIG. 14 is an explanatory diagram of ray tracking of a lightguide having trapezoidal concave patterns.
Figure 14B:
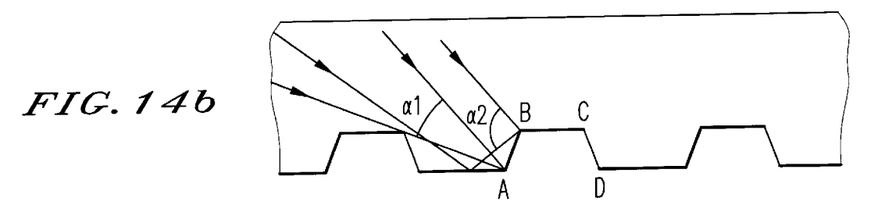

(5) Advantage of Protruding Pattern:

The scattering reflection characteristic of the unit trapezoidal protruding pattern may be found by considering only the rays incident on the opening of the protruding pattern provided based on the scattering reflection surface $3b$, i.e., the edge AD of the trapezoid ABCD in FIG. 4 as described above and the pattern density may be readily designed to uniform the luminance because the neighboring patterns influence less even if the patterns are disposed densely. However, it is complicated in case of concave patterns. FIG. 14 is an explanatory diagram of ray tracking in case of the trapezoidal concave patterns, wherein FIG. 14($a$) shows a case when the patterns are disposed at a low density and FIG. 14($b$) shows a case when they are disposed at a high density. Noticing on the trapezoid ABCD, i.e., one pattern, what is effective for the scattering reflection is only an edge AB and the edge AB corresponds to the opening of the protruding pattern described above, i.e., the edge AD. In case of FIG. 14($a$) in which the density is low, rays which can be incident around the point A of the edge AB are those within the range of angle $\alpha 1$ and rays within the range of angle $\alpha 2$ can be incident around the point B. The same applies also to each incident point at the intermediate section of the edge AB. While the total of all rays which can be incident on the edge AB corresponds to the opening of the concave pattern ABCD, it is apparent that the opening of (b) is smaller than that of (a) because the patterns adjoin each other. That is, the scattering reflection performance of the unit pattern is highly efficient when the pattern density is low and is low when the pattern density is high. That is, the scattering reflection performance of the unit pattern changes in complex depending on the density of the disposed patterns. Because the concave patterns accompany such complexity, it becomes very difficult to design the pattern density to uniform the luminance.

When the diffusion sheet or the scattering reflection sheet having minute irregularity is contacted on the level surface of the lightguide interfacing with air, light scatters and leaks out of the lightguide system at the contact point in general. This condition changes largely not only by the condition of the minute irregular surface of the diffusion sheet or the reflection sheet but also by pressure. The general back-light is constructed while containing such condition and the uniform luminance as a surface light source may become unstable. While the level surface $3b$ on the pattern forming plane is important for the guided light and is desirable to have no such unstableness, the level surface $3b$ does not contact with the diffusion sheet or the reflection sheet when the pattern is the protruding pattern from this aspect. The protruding pattern is better from such reasons.

BEST MODE FOR CARRYING OUT THE INVENTION

The present invention will be explained in detail based on embodiments.

(First through Third Embodiments)

Figure 15A:
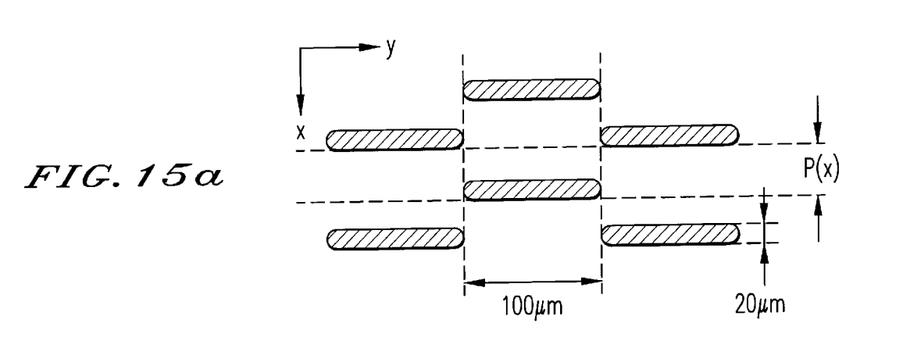
FIG. 15 is a diagram showing one example of pattern design of the lightguide based on the present invention.
Figure 15B:
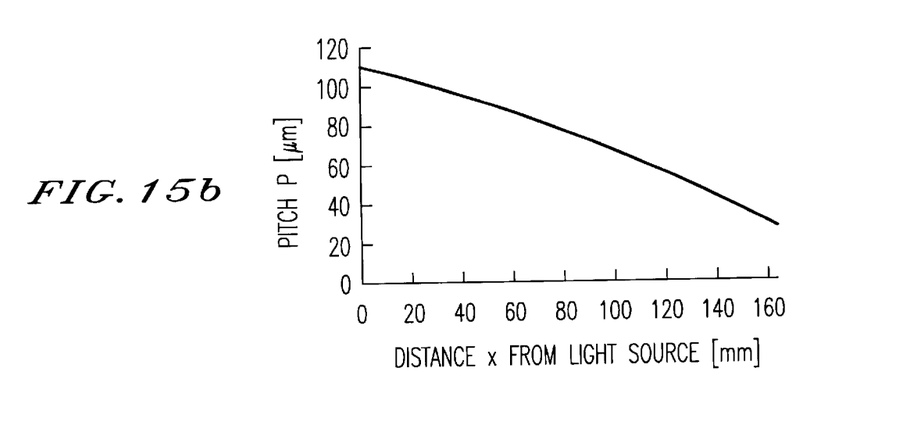

A photomask made of glass having patterns as illustrated in FIG. 15($a$) was formed by setting the cross-sectional width W of unit pattern at 20, 60 and 200 μm, the ratio H/W at 0.6, 0.3 and 0.1 and the pattern height H at 12, 18 and 20 μm, respectively, and by designing the density distribution of patterns whose cross section is approximately trapezoidal and suitable for the scattering reflection performance (FIG. 15($b$) shows the pitch P. These three kinds of photomasks will be denoted as patterns 1, 2 and 3). A positive type photoresist was spin-coated on a glass substrate into a designed thickness and the photomasks were overlaid on the photoresist to expose by ultraviolet rays of a predetermined quantity of light. They were then developed by using developer and trapezoidal protruding resist patterns whose cross-sectional height are 12, 18 and 20 μm and whose slope angle $\delta$ is about 20° was formed on the glass substrate. Nickel sputtering was implemented in a thickness of several tens nm on this resist pattern surface to implement a conductive process and nickel electroforming was implemented in a thickness of 300 μm to fabricate a die. Acrylic lightguide whose size is 10.4 inches, whose thickness of a light receiving end on the long edge side is 3.0 mm, whose thickness of the opposing ends is 1.1 mm, i.e., whose cross-sectional shape is tapered, and in which a large number of trapezoidal protruding patterns are created at the lower surface as shown in FIG. 15 were obtained. The results turned out as shown in the first, second and third embodiments of Table 1, respectively. Although there has been some difficulty in terms of the pattern transferability and the releasability from the die in case of one which is fine, has a large H/W and W=20 μm, its molding has been possible. When the lightguide was observed visually from the above by setting a cold cathode ray tube of 2.6 mm in diameter on the end plane of the lightguide at the thicker and longer edge side as the primary light source and by placing the reflection sheet on the back of the scattering reflection pattern, no local luminous unevenness caused by the roughness of the patterns was observed and the luminance was uniform. Further, when the distribution of luminance was measured by disposing the diffusion sheet and one prism sheet on the emitting surface, the lightguide had the good luminous uniformity as shown in Table 1 and was a bright and uniform lightguide whose average luminance is also high.

SECOND COMPARATIVE EXAMPLE

The resist pattern was molded in the same manner with the embodiments described above except of that a negative type photomask 4 in which the white and black pattern of the photomask 1 is reversed is used and that the spin-coating is implemented so that the thickness turns out to be 12 μm. While the pattern was a concave whose cross section is approximately trapezoidal, its uniformity ratio of illuminance was bad as its luminance around the light source is low and is high at the end and the average luminance was also low. It was unstable and was not suitable as a lightguide because its luminance increases partially when pressure is applied to that part or the uniformity of luminance is lost depending on a fixing method.

TABLE 1

|  |  | Embodiments |  |  |  |  |  | Comparative Embodiments |  |
|---|---|---|---|---|---|---|---|---|---|
|  |  | 1 | 2 | 3 | 4 | 5 | 6 | 1 | 2 |
| Pattern |  | 1 | 2 | 3 | 1 | 2 | 3 | 1 | 4 |
| Heat Treatment of Resist Pattern |  | None | None | None | Implemented | Implemented | Implemented | None | None |
| Irregularity of Pattern |  | Convex | Convex | Convex | Convex | Convex | Convex | Convex | Concave |
| Trapezoid Cross-Sectional Width W | (μm) | 20 | 60 | 200 | 20 | 60 | 200 | 20 | 20 |
| Trapezoid Cross-Sectional Height H | (μm) | 12 | 18 | 20 | 12 | 18 | 20 | 12 | 12 |
| H/W |  | 0.6 | 0.3 | 0.1 | 0.6 | 0.3 | 0.1 | 0.6 | 0.6 |
| Trapezoid Cross-Sectional Slope Angle δ | (°) | 20 | 25 | 25 | 20 | 25 | 25 | <3 | 20 |
| Moldability |  | Δ | ○ | ○ | ◎ | ◎ | ◎ | X | Δ |
| Minuteness of Patterns |  | ◎ | ○ | Δ | ◎ | ○ | Δ | ◎ | ◎ |
| Average Luminance | (cd/m$^2$) | 1,710 | 1,690 | 1,700 | 1,670 | 1,650 | 1,730 | 1,420 | 1,530 |
| Uniformity Ratio of Illuminance | (%) | 92 | 88 | 90 | 87 | 85 | 81 | 72 | 69 |

(Fourth through Fifth Embodiments)

A trapezoidal and protruding resist pattern was formed by using the photomasks of the patterns 1, 2 and 3 and by processing in the same manner with the first, second and third embodiments, respectively. These are then treated by heat to transform into the trapezoidal protruding resist patterns whose corners are rounded. An acrylic lightguide having a size of 10.4 inches was molded similarly through the conductive process and electroforming. The results turned out as shown in Table 1 (second embodiment) and the transferability and the releasability were very good. The uniformity of luminance and the average luminance of them were not both inferior as compared to the first, second and third embodiments.

FIRST COMPARATIVE EXAMPLE

A protruding resist pattern which has a slope angle δ<3° and whose cross section is almost rectangular was obtained by using the photomask of the pattern 1, by setting W=20 μm, H/W=0.6 and H=12 μm and by changing the exposure and developing conditions. When a die was fabricated and molded by processing in the same manner with the above-mentioned embodiments, the pattern transferability was bad and it was very difficult to release the product from the die. When the distribution of luminance was measured, its uniformity ratio of illuminance was bad as its luminance around the light source is low and is high at the end and the average luminance was also low because the scattering reflection performance of unit pattern is low as shown in the first comparative example in Table 1.

INDUSTRIAL APPLICABILITY

As described above, the present inventive lightguide is highly luminous and is excellent in terms of the luminous uniformity and may be used effectively as a back illuminator of a liquid crystal display of a word-processor, a personal computer, a thin-type television set and the like.

What is claimed is:

1. An edge-light lightguide which guides light from at least one side end plane, comprising:

a light emitting surface;

a rear surface opposing said light emitting surface, said rear surface comprising a large number of approximately trapezoidal protrusions arranged in a pattern, said protrusions including an apex edge in the cross section perpendicular to the axis of a linear light source with an at least partially straight section, said aproximately trapezoidal protrusion pattern being a pattern of specks, solid-lines, or broken-lines, said pattern having a low am density in a region neighboring the at least one side end plane and having a high area density in a region removed from the at least one side end plane such that a luminance distribution of light emitted from the light emitting surface is approximately uniform.

2. The lightguide according to claim 1, wherein the approximately trapezoidal protrusions include two rounded corners corresponding to both ends of the apex edge in the cross section perpendicular to the axis of the linear light source.

3. The lightguide according to claim 1, wherein:

the straight section of the apex edge of the protrusions has an apex edge roughness of less than 0.2 μm; and said rear surface has a rear surface roughness of less than 0.2 μm excluding said approximately trapezoidal protrusions.

4. The lightguide according to claim 1, wherein said approximately trapezoidal protrusions have a cross-sectional height H and a cross-sectional width W and a ratio H/W of $0.1 \leq H/W \leq 0.6$.

5. The lightguide according to claim 1, wherein said approximately trapezoidal protrusions have a cross-sectional width W of $20 \; \mu m \leq W \leq 200 \; \mu m$.

* * * * *